United States Patent
Cheng

(10) Patent No.: US 6,723,159 B2
(45) Date of Patent: Apr. 20, 2004

(54) AIR FILTER CAPABLE OF VISUAL INDICATION OF A CLOGGED CONDITION THEREOF

(76) Inventor: Meng-Chieh Cheng, No. 169, Chung-Shan Rd., Fengyuan City, Taichung Hsien (TW)

(*) Notice: Subject to any disclaimer, the term of this patent is extended or adjusted under 35 U.S.C. 154(b) by 0 days.

(21) Appl. No.: 10/201,412

(22) Filed: Jul. 22, 2002

(65) Prior Publication Data

US 2003/0205143 A1 Nov. 6, 2003

(30) Foreign Application Priority Data

May 1, 2002 (TW) .................................. 91206070 U

(51) Int. Cl.[7] .......................................... B01D 35/143
(52) U.S. Cl. .......................... 96/421; 96/422; 55/471; 55/486; 55/DIG. 34; 116/271; 116/DIG. 25
(58) Field of Search ........................ 55/467, 471, 486, 55/DIG. 34; 96/417, 421, 422; 116/271, DIG. 25

(56) References Cited

U.S. PATENT DOCUMENTS

| 2,172,399 A | * | 9/1939 | Mueller ................. 126/110 R |
| 2,746,416 A | * | 5/1956 | Aufderheide ............... 116/275 |
| 6,190,442 B1 | * | 2/2001 | Redner ......................... 96/421 |

* cited by examiner

Primary Examiner—Robert A. Hopkins
(74) Attorney, Agent, or Firm—Townsend and Townsend and Crew, LLP

(57) ABSTRACT

An air filter capable of visual indication of a clogged condition thereof includes a housing, a filter unit, a fan unit and a signaling device. The housing has an air inlet, an air outlet, and an air passage extending from the air inlet to the air outlet. The signaling device includes a flap disposed to span the air passage, a horizontal pivot pin connected securely to the flap and pivotable relative to the housing, and a pointer connected to one end of the pivot pin and rotatable with the pivot pin relative to the housing. A reduction in air flow through the air passage attributed to a clogged condition of the air filter causes the flap to pivot and move the pointer relative to the housing so as to indicate the clogged condition of the air filter.

8 Claims, 5 Drawing Sheets

AIR FILTER CAPABLE OF VISUAL INDICATION OF A CLOGGED CONDITION THEREOF

BACKGROUND OF THE INVENTION

1. Field of the Invention

This invention relates to an air filter, more particularly to an air filter capable of visual indication of a clogged condition thereof.

2. Description of the Related Art

A conventional air filter including a filter unit for filtering air flowing through the air filter is known in the art. However, prolonged operation of the air filter in a clogged condition of the filter unit will lead to a low air-filtering efficiency and may result in breakdown of a fan unit of the air filter.

SUMMARY OF THE INVENTION

Therefore, the object of the present invention is to provide an air filter capable of visual indication of a clogged condition thereof, thereby permitting timely maintenance of the air filter.

According to this invention, the air filter capable of visual indication of a clogged condition thereof includes a housing, a filter unit, a fan unit and a signaling device. The housing has an air inlet, an air outlet, and an air passage extending from the air inlet to the air outlet. The filter unit is mounted on the housing for filtering air flowing through the air passage. The fan unit is mounted in the housing for drawing air into the air passage via the air inlet and for blowing air out of the air passage via the air outlet. The signaling device includes a flap disposed to span the air passage, a horizontal pivot pin connected securely to the flap and pivotable relative to the housing, and a pointer connected to one end of the pivot pin and rotatable with the pivot pin relative to the housing. Air flow through the air passage in an unclogged condition of the air filter blows the flap to pivot and cause the pivot pin to rotate and move the pointer to a first position relative to the housing. A reduction in the air flow through the air passage attributed to a clogged condition of the air filter causes the flap to pivot and move the pointer to a second position relative to the housing so as to indicate the clogged condition of the air filter.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
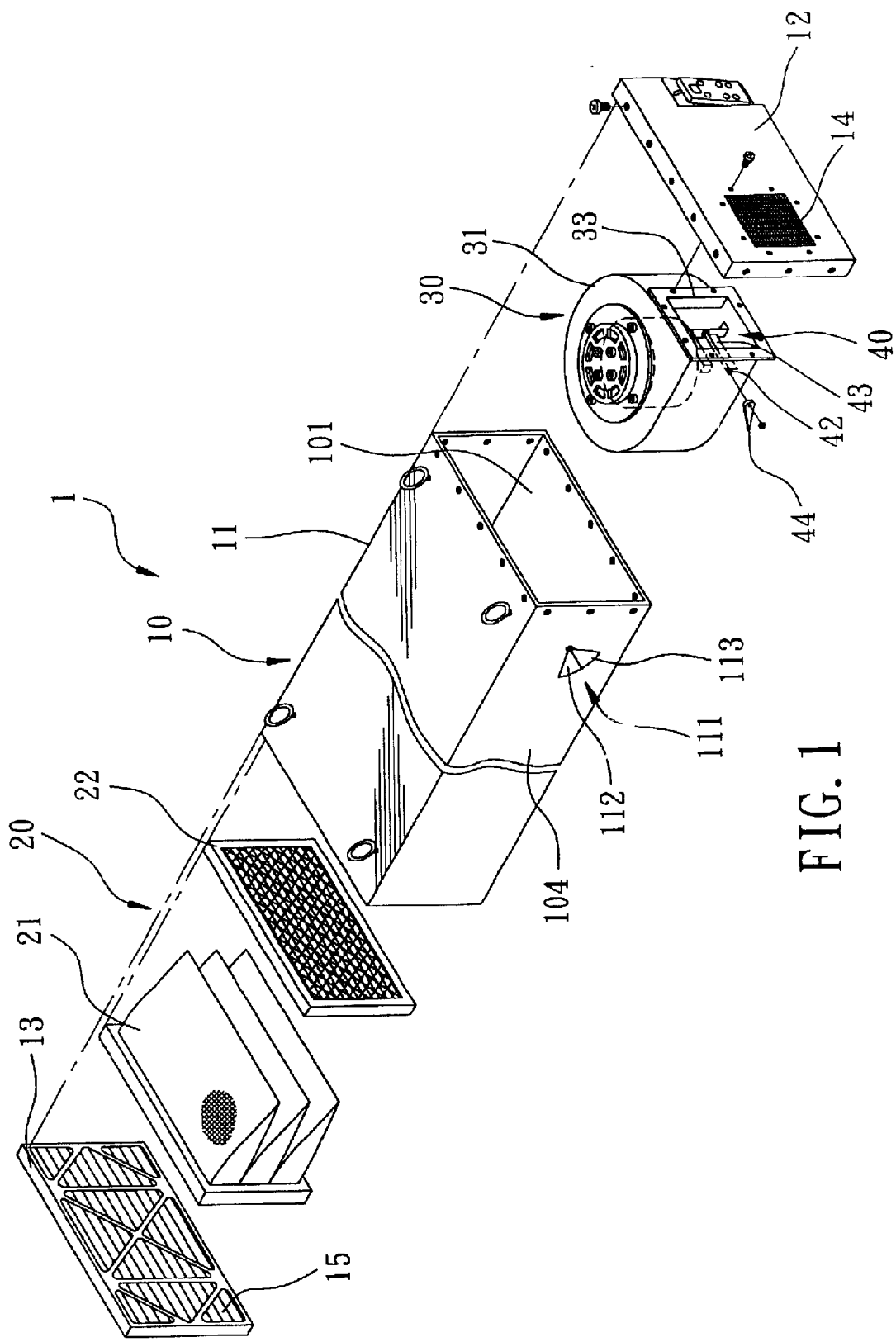
FIG. 1 is an exploded perspective view of a preferred embodiment of an air filter according to the present invention.
Figure 2:
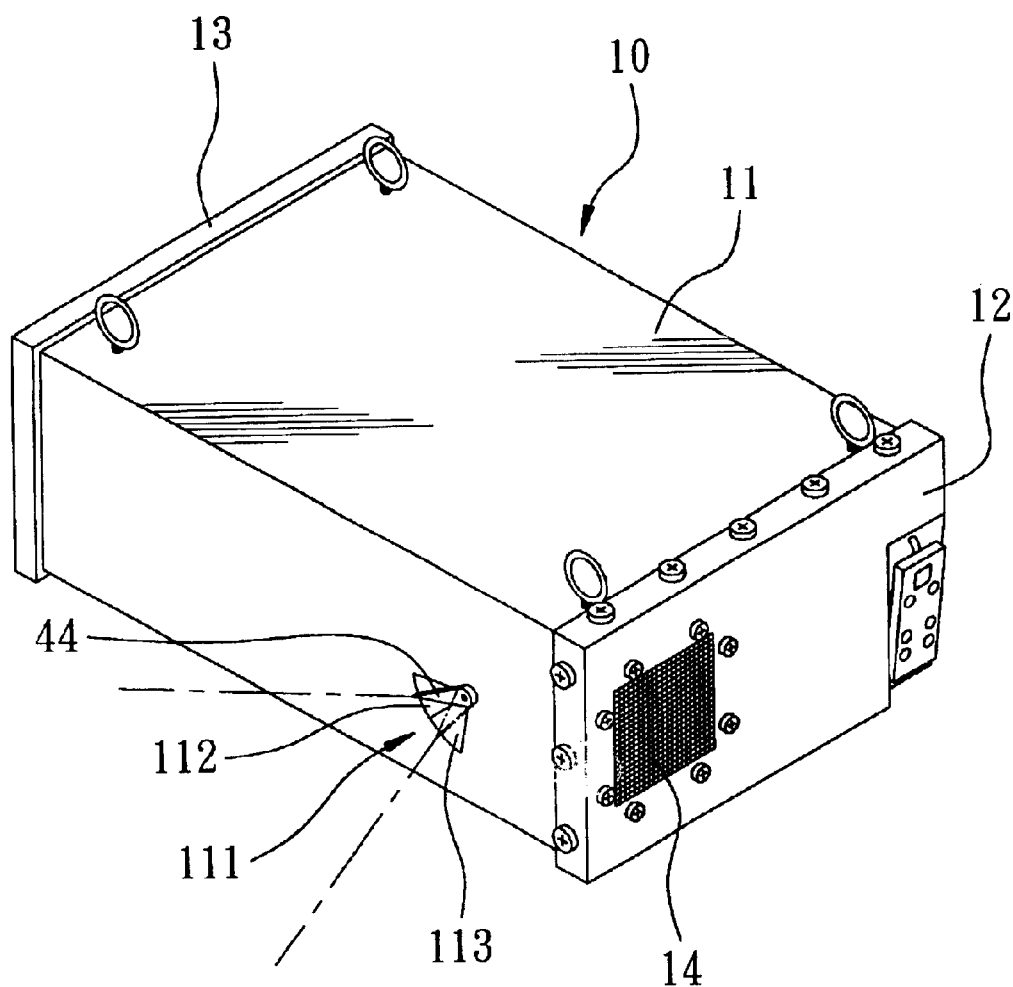
FIG. 2 is an assembled perspective view of the preferred embodiment of the air filter according to the present invention.

Referring to FIGS. 1 to 5, the preferred embodiment of the air filter 1 according to the present invention is shown to comprise a housing 10, a filter unit 20, a fan unit 30 and a signaling device 40.

As illustrated, the housing 10 has an air inlet 15, an air outlet 14, and an air passage 101 extending from the air inlet 15 to the air outlet 14. The filter unit 20 is mounted on the housing 10 for filtering air flowing through the air passage 101. The fan unit 30 is mounted in the housing 10 for drawing air into the air passage 101 via the air inlet 15 and for blowing air out of the air passage 101 via the air outlet 14.

Figure 3:
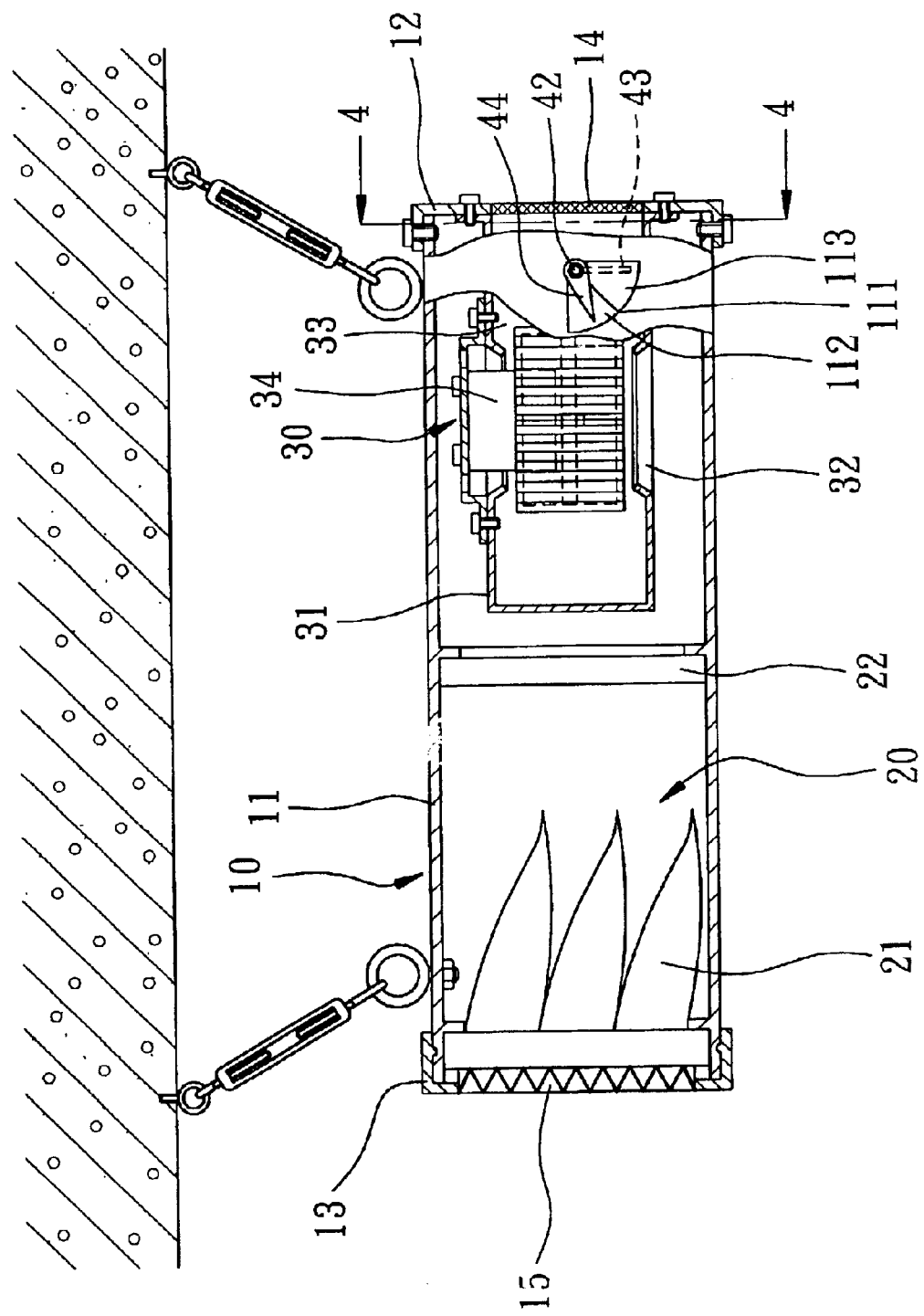
FIG. 3 is a partly cross-sectional view of the preferred embodiment of the air filter according to the present invention.
Figure 5:
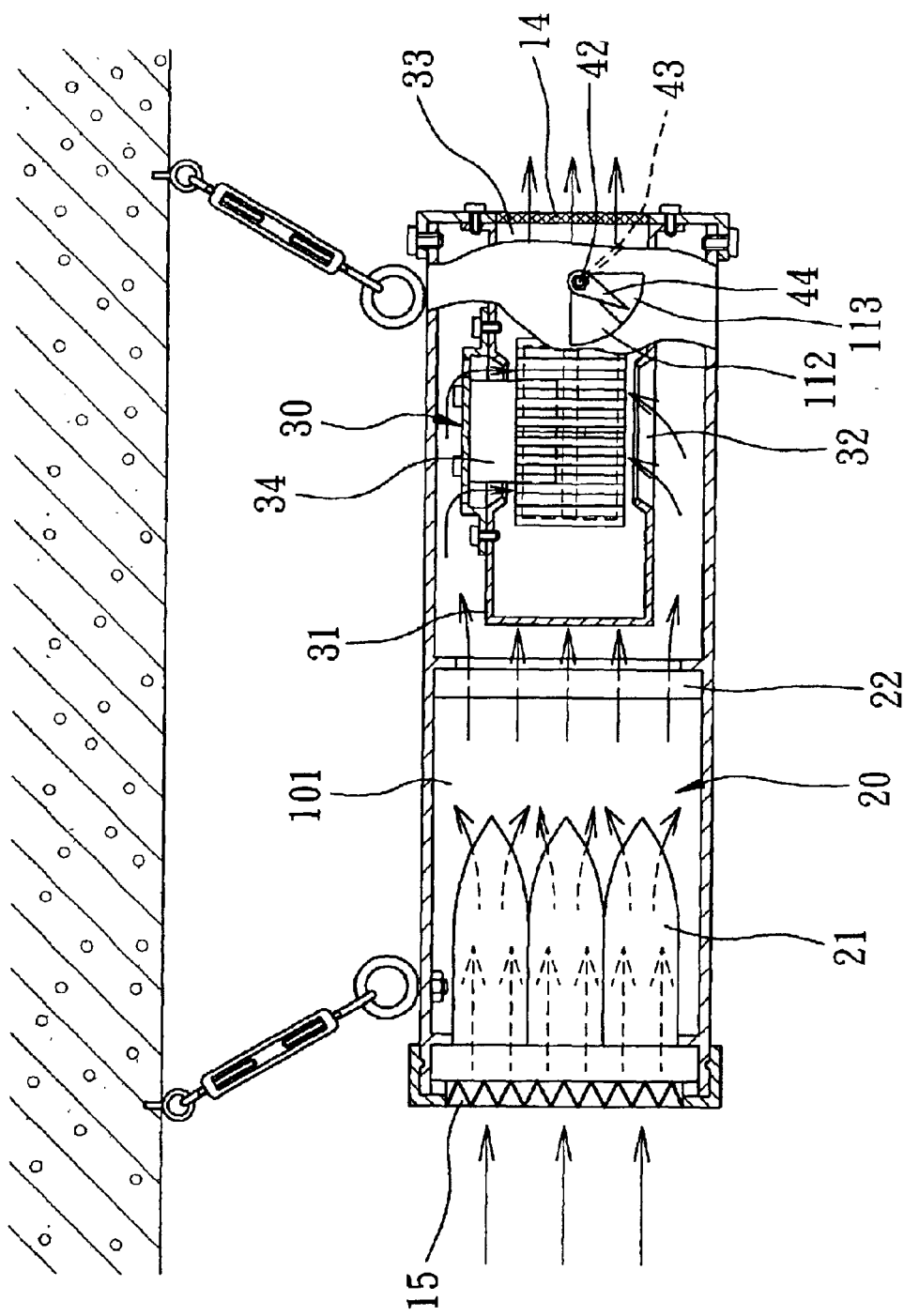
FIG. 5 is a view similar to FIG. 3, showing the preferred embodiment in a state of use.

The signaling device 40 includes a flap 43 disposed to span the air passage 101, a horizontal pivot pin 42 connected securely to the flap 43 and pivotable relative to the housing 10, and a pointer 44 connected to one end of the pivot pin 42 and rotatable with the pivot pin 42 relative to the housing 10. Air flow through the air passage 101 in an unclogged condition of the air filter 1 blows the flap 43 to pivot and cause the pivot pin 42 to rotate and move the pointer 44 to a first position relative to the housing 10, as best shown in FIG. 5. A reduction in the air flow through the air passage 101 attributed to a clogged condition of the air filter 1 causes the flap 43 to pivot and move the pointer 44 to a second position relative to the housing 10 so as to indicate the clogged condition of the air filter 1, as best shown in FIG. 3.

Figure 4:
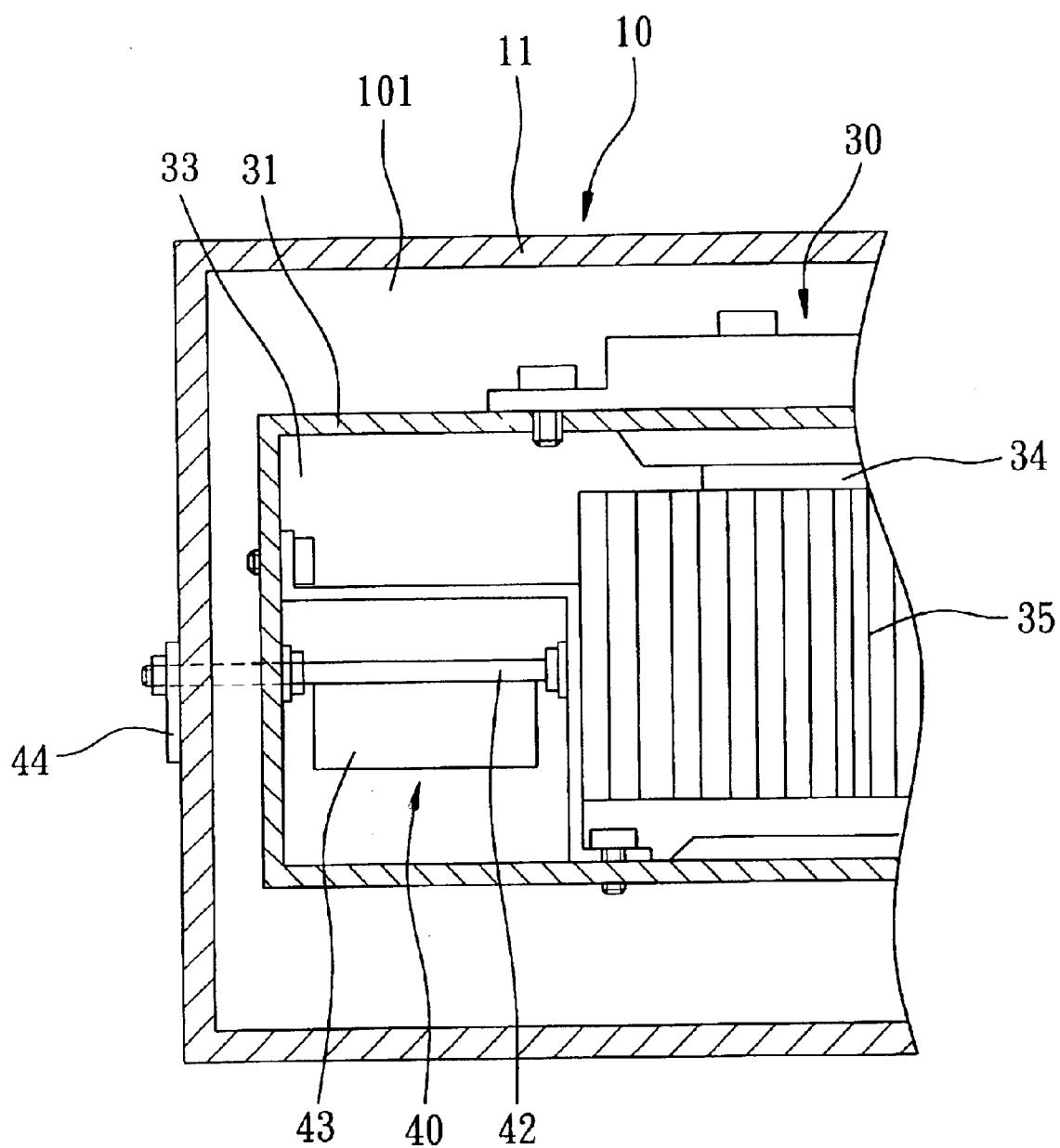
FIG. 4 is a fragmentary cross-sectional view of the preferred embodiment shown in FIG. 3, taken along lines 4—4 thereof.

In this embodiment, the flap 43 is disposed in the air passage 101 adjacent to the air outlet 14. One end of the pivot pin 42 extends through the housing 10, and the pointer 44 is disposed outwardly of the air passage 101, as best shown in FIG. 4.

In this embodiment, the housing 10 has an outer wall surface 104 formed with air flow indicia 111 pointed to by the pointer 44. Preferably, the air flow indicia 111 is in the form of a sector-shaped area. The area is divided into two regions 112, 113, one for indicating the clogged condition and the other for indicating the unclogged condition of the air filter 1.

As best shown in FIG. 1, the housing 10 includes a housing body 11 with front and rear ends, a front cover 12 mounted on the front end of the housing body 11 and formed with the air outlet 14, and a rear cover 13 mounted on the rear end of the housing body 11 and formed with the air inlet 15.

In this embodiment, the filter unit 20 is mounted in the housing 10 adjacent to the air inlet 15. Preferably, the filter unit 20 includes a filter bag 21 disposed in the air passage 101 between the air inlet 15 and the air outlet 14, and a filter membrane 22 disposed between the filter bag 21 and the air outlet 14. As such, dust of large and small particle size can be separately captured by the filter bag 21 and the filter membrane 22.

In this embodiment, the fan unit 30 includes a fan casing 31 having a fan inlet 32 and a fan outlet 33, the fan outlet 33 being disposed adjacent to the air outlet 14. The flap 43 is disposed in the fan casing 31 adjacent to the fan outlet 33. Preferably, the fan unit 30 further includes a motor 34 mounted in the fan casing 31 for driving a plurality of fan blades 35, as best shown in FIG. 4.

In view of the signaling device of the air filter according to the present invention, a clogged condition of the filter unit can be readily indicated to the user, thereby enabling the user to timely maintain the air filter so as to ensure the filtering efficiency of the air filter and avoid breakdown of components of the air filter.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An air filter capable of visual indication of a clogged condition thereof, comprising:

a housing formed with an air inlet, an air outlet, and an air passage extending from said air inlet to said air outlet, said housing including a housing body with front and rear ends, a front cover mounted on said front end of said housing body and formed with said air outlet, and a rear cover mounted on said rear end of said housing body and formed with said air inlet;

a filter unit mounted on said housing for filtering air flowing through said air passage;

a fan unit mounted in said housing for drawing air into said air passage via said air inlet and for blowing air out of said air passage via said air outlet; and a signaling device including a flap disposed to span said air passage, a horizontal pivot pin connected securely to said flap and pivotable relative to said housing, and a pointer connected to one end of said pivot pin and rotatable with said pivot pin relative to said housing, wherein air flow through said air passage in an unclogged condition of said air filter pivots said flap and causes said pivot pin to rotate and move said pointer to a first position relative to said housing, and wherein a reduction in the air flow through said air passage attributed to a clogged condition of said air filter causes said flap to pivot and move said pointer to a second position relative to said housing so as to indicate the clogged condition of said air filter.

2. The air filter as claimed in claim 1, wherein said flap is disposed in said air passage adjacent to said air outlet, said one end of said pivot pin extending through said housing, said pointer being disposed outwardly of said air passage.

3. The air filter as claimed in claim 2, wherein said housing has an outer wall surface formed with air flow indicia pointed to by said pointer.

4. The air filter as claimed in claim 3, wherein said air flow indicia is in the form of a sector-shaped area.

5. The air filter as claimed in claim 1, wherein said filter unit is mounted in said housing adjacent to said air inlet.

6. The air filter as claimed in claim 5, wherein said filter unit includes a filter bag disposed in said air passage between said air inlet and said air outlet, and a filter membrane disposed between said filter bag and said air outlet.

7. The air filter as claimed in claim 1, wherein said fan unit includes a fan casing having a fan inlet and a fan outlet, said fan outlet being disposed adjacent to said air outlet, said flap being disposed in said fan casing adjacent to said fan outlet.

8. An air filter capable of visual indication of a clogged condition thereof, comprising:

a housing formed with an air inlet, an air outlet, and an air passage extending from said air inlet to said air outlet;

a filter unit mounted on said housing for filtering air flowing through said air passage;

a fan unit mounted in said housing for drawing air into said air passage via said air inlet and for blowing air out of said air passage via said air outlet; and a signaling device including a flap disposed to span said air passage, a horizontal pivot pin connected securely to said flap and pivotable relative to said housing, and a pointer connected to one end of said pivot pin and rotatable with said pivot pin relative to said housing, said fan unit including a fan casing having a fan inlet and a fan outlet, said fan outlet being disposed adjacent to said air outlet, said flap being disposed in said fan casing adjacent to said fan outlet, wherein air flow through said air passage in an unclogged condition of said air filter pivots said flap and causes said pivot pin to rotate and move said pointer to a first position relative to said housing, and wherein a reduction in the air flow through said air passage attributed to a clogged condition of said air filter causes said flap to pivot and move said pointer to a second position relative to said housing so as to indicate the clogged condition of said air filter.

* * * * *